(12) United States Patent
Iwase

(10) Patent No.: US 12,355,923 B2
(45) Date of Patent: *Jul. 8, 2025

(54) IMAGE FORMING DEVICE, IMAGE READING DEVICE, NON-TRANSITORY RECORDING MEDIUM STORING COMPUTER-READABLE PROGRAM, IMAGE FORMING METHOD, AND IMAGE PROCESSING DEVICE

(71) Applicant: KONICA MINOLTA, INC., Tokyo (JP)

(72) Inventor: Tomohiro Iwase, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/443,794

(22) Filed: Feb. 16, 2024

(65) Prior Publication Data

US 2024/0187534 A1 Jun. 6, 2024

Related U.S. Application Data

(60) Continuation of application No. 18/068,628, filed on Dec. 20, 2022, now Pat. No. 11,943,395, which is a
(Continued)

(30) Foreign Application Priority Data

Mar. 13, 2017 (JP) ................................. 2017-047731

(51) Int. Cl.
*G06F 3/12* (2006.01)
*G06K 15/02* (2006.01)
*H04N 1/00* (2006.01)

(52) U.S. Cl.
CPC ....... *H04N 1/00013* (2013.01); *G06F 3/1218* (2013.01); *H04N 1/00084* (2013.01);
(Continued)

(58) Field of Classification Search
None
See application file for complete search history.

(56) References Cited

U.S. PATENT DOCUMENTS 5,448,078 A 9/1995 Nakazawa
7,017,492 B2 3/2006 Seymour
(Continued)

FOREIGN PATENT DOCUMENTS

JP H1139492 A 2/1999
JP 2001038885 A 2/2001
(Continued)

*Primary Examiner* — Beniyam Menberu
(74) *Attorney, Agent, or Firm* — BUCHANAN, INGERSOLL & ROONEY PC

(57) ABSTRACT

An image forming device includes: an image forming unit that forms an image on a transfer medium; and a controller that controls multiple image readers capable of performing image reading for the same surface of the transfer medium, and acquires reading results from the image readers. The controller is capable of performing failure/no-failure determination for the image on the transfer medium based on the reading results, of switching image reading by the multiple image readers between reading by a first number of image readers and reading by a second number of image readers, the second number being smaller than the first number, and of enabling, while the second number of image readers perform reading, at least one of the other image readers to execute a maintenance operation for the at least one of the other image readers.

13 Claims, 10 Drawing Sheets

Related U.S. Application Data division of application No. 17/332,573, filed on May 27, 2021, now Pat. No. 11,563,862, which is a division of application No. 15/914,263, filed on Mar. 7, 2018, now Pat. No. 11,128,760.

(52) U.S. Cl.
CPC ..... *H04N 1/00814* (2013.01); *H04N 1/00822* (2013.01); *H04N 1/00909* (2013.01)

(56) References Cited

U.S. PATENT DOCUMENTS

| | | | |
|---|---|---|---|
| 7,796,307 | B2 | 9/2010 | Shiokawa et al. |
| 11,563,862 | B2 * | 1/2023 | Iwase .................. H04N 1/00814 |
| 11,943,395 | B2 * | 3/2024 | Iwase .................. H04N 1/00814 |
| 2006/0147092 | A1 | 7/2006 | Zhang et al. |
| 2008/0030717 | A1 * | 2/2008 | Engler ...................... G01J 3/50 |
| | | | 356/73 |
| 2008/0297856 | A1 | 12/2008 | Orita |
| 2009/0314413 | A1 | 12/2009 | Brandow et al. |
| 2010/0091339 | A1 | 4/2010 | Kwon et al. |
| 2010/0118361 | A1 | 5/2010 | Iguchi |
| 2011/0169893 | A1 | 7/2011 | Takafuji |
| 2012/0044540 | A1 | 2/2012 | Dalal et al. |
| 2013/0164000 | A1 | 6/2013 | Nemoto et al. |
| 2015/0281487 | A1 | 10/2015 | Motoyama |
| 2015/0350460 | A1 * | 12/2015 | Hirata .................. H04N 1/0057 |
| | | | 358/498 |
| 2015/0350493 | A1 | 12/2015 | Sakatani |
| 2016/0062296 | A1 * | 3/2016 | Nakamura ......... G03G 15/6558 |
| | | | 399/15 |
| 2016/0277629 | A1 | 9/2016 | Waidman et al. |
| 2017/0223206 | A1 | 8/2017 | Katagiri |
| 2017/0257495 | A1 | 9/2017 | Kanaya |
| 2017/0277100 | A1 * | 9/2017 | Xu ....................... G03G 15/607 |
| 2018/0128751 | A1 | 5/2018 | Ingram et al. |
| 2018/0262627 | A1 | 9/2018 | Iwase |
| 2019/0005286 | A1 | 1/2019 | Suman et al. |
| 2021/0306469 | A1 | 9/2021 | Iwase |
| 2023/0121982 | A1 | 4/2023 | Iwase |

FOREIGN PATENT DOCUMENTS

| | | | | |
|---|---|---|---|---|
| JP | 2016149659 | * | 8/2016 | .............. B41J 29/17 |
| WO | 2017109801 | A1 | 6/2017 | |

* cited by examiner

IMAGE FORMING DEVICE, IMAGE READING DEVICE, NON-TRANSITORY RECORDING MEDIUM STORING COMPUTER-READABLE PROGRAM, IMAGE FORMING METHOD, AND IMAGE PROCESSING DEVICE

CROSS-REFERENCES TO RELATED APPLICATIONS

This application is a Continuation of U.S. patent application Ser. No. 18/068,628, filed Dec. 20, 2022, which is a Divisional of U.S. patent application Ser. No. 17/332,573, filed May 27, 2021, which is a Divisional of U.S. patent application Ser. No. 15/914,263, filed on Mar. 7, 2018, and claims the benefit of Japanese Patent Application No. 2017-047731, filed on Mar. 13, 2017, the entire contents of each of which are incorporated herein by reference.

BACKGROUND

Technological Field

This invention relates to an image forming device, an image reading device, a non-transitory recording medium storing a computer-readable program, an image forming method, and an image processing device that can determine failure/no-failure of an image on a transfer medium based on the results of reading of the image on the transfer medium.

Description of the Related Art

In the field of image forming devices, such as copiers, printers, copier-based multifunction peripherals, determination related to image abnormality and image quality adjustment is performed using read image data of read images on sheets. For example, a device is known in which a read image is compared with image data for printing and, if the printed image does not correspond to it, abnormality determination is carried out or insert paper, a cut margin, or the like of a sheet is printed with an image for adjustment which is then read so that adjustment of the image quality can be performed. In addition, in the case where an image for adjustment is read, whether the image has an abnormality can be determined according to an adjustment failure or the like. If the image is determined to be abnormal, the sheet is regarded as a waste and, in general, output is halted or the waste sheet is ejected to an unusual output destination.

Meanwhile, an image reading unit for reading images reads images during conveyance of sheets; thus, the image reading unit is susceptible to adherence of dust and paper particles. With dust or paper particles on the image reading unit, even if no abnormality is found in the printed image, the read image contains an image reflecting the dust or paper particles, and analysis based on this read image determines that the image has an abnormality. Further, in some cases, the image reading unit suffers from variations in characteristics, such as light emission and light reception characteristics, depending on changes with time and environmental conditions (e.g., temperature). In this state, if the image forming unit undergoes correction based on the reading results, the correction results fluctuate, which can affect the stability of the quality of the print.

For this reason, in the image reading unit, correction is performed for correcting the reading results and maintenance operations including regular cleaning are conducted, thereby ensuring the accuracy of reading images. Regarding contamination on the image reading unit, image reading is halted for cleaning and, if correction is needed, reading is halted for correction.

Although a maintenance operation is usually performed in the job idling state in which no job is executed, in the case of a job requiring a long time for printing, reading accuracy changes while the job is executed, causing a risk of a failure in maintenance of the quality of the output. Therefore, a device has been proposed in which automatic correction is conducted at regular time intervals during the execution of a job, so that even a large number of document sheets can be printed with a maintained print quality.

In this situation, the problems are that the productivity for cut-sheet paper is low and that, in the case of a continuous sheet of paper, the output is constantly conveyed and correction performed between jobs hinders data acquisition therebetween. Another problem is that, in a waste detection system, in case of occurrence of a waste in a section in which data of the reading results cannot be acquired, the waste cannot be detected and the entire surface cannot therefore be scanned.

A way of solving these problems is to install two image reading units such that these image reading units alternately perform reading. Japanese Patent Laid-Open No. 2001-38885 and Japanese Patent Laid-Open No. 11-39492, for example, involve use of two sensors.

In Japanese Patent Laid-Open No. 2001-38885, the image-pickup range of an image-pickup device is divided into multiple image sections, multiple computing units performing a comparison for each image section are provided, the computing unit detecting a predetermined specific mark is caused to perform detection of the amount of phase shift between a test image and a reference image, and the computing unit detecting no specific mark is caused to perform a comparison between a test image and a reference image, involving phase correction based on the amount of phase shift.

In Japanese Patent Laid-Open No. 11-39492, image-pickup of a sheet having a width out of the range that can be covered by a single scanner is performed using multiple scanners, and positional deviation correction is performed first for a picked-up image including an image to commit to print, thereby performing determination of image failure/no-failure.

However, according to the above-described patent literatures, two sensors or scanners are used with a divided image-pickup range; thus, if cleaning or correction is performed with a single sensor or scanner, accurate reading cannot be achieved, failing to solve the above-described problems. For this reason, there are still problems of a reduction in productivity and occurrence of a range in which waste detection cannot be acquired.

SUMMARY

An object of the present invention, which has been made in the above-described background, is to provide an image forming device, an image reading device, a non-transitory recording medium storing a computer-readable program, an image forming method, and an image processing device that allow image failure/no-failure determination through image reading to be accurately performed while avoiding a reduction in productivity and occurrence of an unreadable range as much as possible.

To achieve at least one of the abovementioned objects, according to an aspect, an image forming device reflecting one aspect of the present invention includes: an image forming unit that forms an image on a transfer medium; and a controller that controls multiple image readers capable of performing image reading for the same surface of the transfer medium, and acquires reading results from the image readers, wherein the controller is capable of performing failure/no-failure determination for the image on the transfer medium based on the reading results, of switching image reading by the multiple image readers between reading by a first number of image readers and reading by a second number of image readers, the second number being smaller than the first number, and of enabling, while the second number of image readers perform reading, at least one of the other image readers to execute a maintenance operation for the at least one of the other image readers.

To achieve at least one of the abovementioned objects, according to an aspect, an image reading device reflecting one aspect of the present invention includes: multiple image readers that are capable of reading an image on the same surface of a transfer medium; and a reading controller that controls the image readers and acquires reading results provided by the image readers, wherein the reading controller is capable of performing failure/no-failure determination for the image on the transfer medium based on the reading results, of switching image reading by the multiple image readers between reading by a first number of image readers and reading by a second number of image readers, the second number being smaller than the first number, and of enabling, while the second number of image readers perform reading, at least one of the other image readers to execute a maintenance operation for the at least one of the other image readers.

To achieve at least one of the abovementioned objects, according to an aspect, a non-transitory recording medium storing a computer-readable program reflecting one aspect of the present invention is a non-transitory recording medium storing a computer-readable program to be executed in a computer that controls multiple image readers capable of performing image reading for the same surface of a transfer medium, and acquires reading results from the image readers, wherein the program causes the computer to execute: performing failure/no-failure determination for an image on the transfer medium based on the reading results; switching image reading by the multiple image readers between reading by a first number of image readers and reading by a second number of image readers, the second number being smaller than the first number; and enabling, while the second number of image readers perform reading, at least one of the other image readers to execute a maintenance operation for the at least one of the other image readers.

To achieve at least one of the abovementioned objects, according to an aspect, an image reading method reflecting one aspect of the present invention includes the steps of: performing failure/no-failure determination for an image on the transfer medium based on the reading results; switching image reading by the multiple image readers between reading by a first number of image readers and reading by a second number of image readers, the second number being smaller than the first number; and enabling, while the second number of image readers perform reading, at least one of the other image readers to execute a maintenance operation for the at least one of the image readers.

To achieve at least one of the abovementioned objects, according to an aspect, an image processing device reflecting one aspect of the present invention includes a processing controller that controls multiple image readers capable of performing image reading for the same surface of a transfer medium, and acquires reading results from the image readers, wherein the processing controller is capable of performing failure/no-failure determination for an image on the transfer medium based on the reading results, of switching image reading by the multiple image readers between reading by a first number of image readers and reading by a second number of image readers, the second number being smaller than the first number, and of enabling, while the second number of image readers perform reading, at least one of the other image readers to execute a maintenance operation for the at least one of the other image readers.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, an embodiment of the present invention will be described with reference to the drawings. However, the scope of the invention is not limited to the disclosed embodiments.

One embodiment of the present invention will now be described with reference to the attached drawings.

Figure 1:
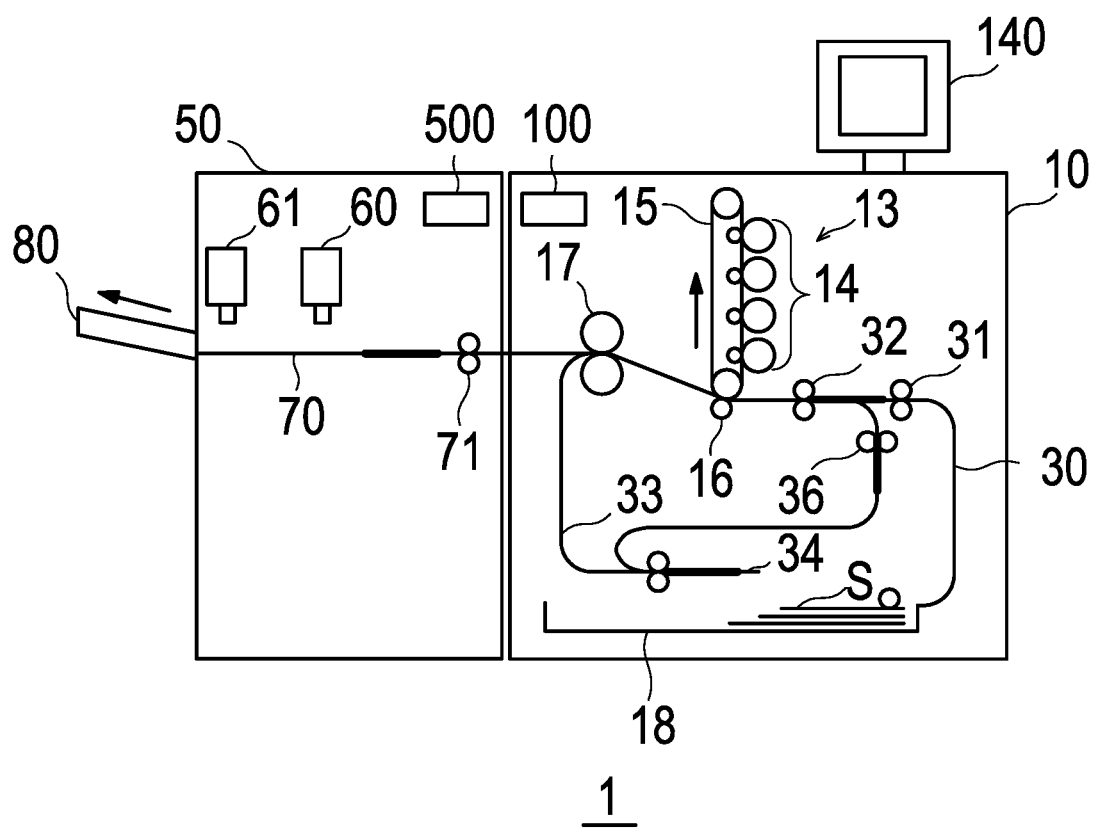
FIG. 1 is a schematic diagram showing an image forming device of one embodiment of the present invention.

FIG. 1 is a mechanical schematic view of an image forming device 1 according to this embodiment.

The image forming device 1 includes a device body 10 and a reading device 50.

The reading device 50 is disposed in a stage following the device body 10 in such a manner that sheet transportation and communication between the device body 10 and the reading device 50 are allowed, the device body 10 performs formation of an image on a sheet, and the sheet with the image formed thereon is transported to the reading device 50 in which the image on the sheet is then read.

Although the devices included in the image forming device 1 are the device body 10 and the reading device 50 shown in the drawing in this embodiment, the configuration of an image forming device of the present invention should not be limited to this combination, and the image forming device 1 can consist of only the device body 10 that does not include a reading device, or can be further connected to other devices. For example, a large-capacity sheet feeder can be disposed in a stage preceding the device body 10, and a postprocessing device can be disposed in a stage following the reading device 50.

If a reading device is provided outside of the image forming device, the reading device can be mechanically connected to or mechanically disconnected from the image forming device. In the case where it is mechanically disconnected therefrom, the image forming device and the reading device can be electrically connected to each other.

The device body 10 includes an operation unit 140 over a housing. The operation unit 140 includes an LCD 141, which includes a touch screen, and can receive an operational input from a user and can display information, and its display and input unit are integrally formed. The display and the input unit can be separated.

The housing of the device body 10 includes a sheet feeding tray 18, and sheets to undergo image formation are contained in the sheet feeding tray 18. The sheet feeding tray can consist of multiple levels of trays. A sheet corresponds to a transfer medium of the present invention. In the present invention, the material for the transfer medium is not limited to paper and can be a cloth or a plastic sheet. Although not shown in the drawing, a long-length sheet or the like can be fed from the outside of the housing through a manual sheet feeding tray, and a continuous sheet of paper, such as roll paper, can be used.

In the housing, the transportation path 30 is connected to the sheet feeding tray 18, and sheets fed through the sheet feeding tray 18 are transported using transportation rollers 31 and 32, and the like.

An image forming unit 13 is disposed in the middle of the transportation path 30.

The image forming unit 13 includes photoreceptors 14 for the respective colors (in this embodiment, cyan, magenta, yellow, and black), a midpoint transfer belt 15, a transfer roller 16, and a fixer 17, and includes a charger, an LD, and a developer unit, which are not shown in the drawing, around each photoreceptor 14.

The midpoint transfer belt 15 is disposed in such a manner that it can contact the photoreceptors 14 for the respective colors, and the transfer roller 16 is disposed on the opposite side of the transportation path 30 from the midpoint transfer belt 15. The fixer 17 is disposed on the opposite side of the transportation path 30 downstream of the transfer roller 16.

In the image forming unit 13, a latent image is formed on the photoreceptors 14 for the respective colors in accordance with image data through an LD 151 (see FIG. 2), and a toner image is then formed through a developer, which is not shown in the drawing. The toner image formed on the photoreceptors 14 is transferred to the midpoint transfer belt 15, and the image on the midpoint transfer belt 15 is transferred to a sheet transported by the transfer roller 16 along the transportation path 30. The image transferred to the sheet is fixed to the sheet by pressure or heat provided by the fixer 17.

The transportation path 30 includes a flipping transportation path 33 branches downstream of the fixer 17. The branching flipping transportation path 33 includes a flipping unit 34. The flipping transportation path 33 extends downstream and is provided with a transportation roller 36, and its downstream end meets the transportation path 30 upstream of the image forming unit 13.

When an image should be formed on one surface of a sheet, the sheet is not transported to the flipping transportation path 33 but transported straight to the transportation path 30 and then the downstream reading device 50.

When an image should be formed on both surfaces of a sheet, an image is formed on one surface of the sheet through the image forming unit 13, and the sheet is sent to the flipping transportation path 33 and then transported to the flipping unit 34. The sheet sent to the flipping unit 34 is transported downstream of the flipping transportation path 33 with its bottom end facing forward. The sheet with its front and back interchanged and its face and rear face interchanged is transported back to the transportation path 30 and, in the image forming unit 13, an image is formed on the surface of the sheet opposite to the surface on which the image has been previously formed. With this configuration, a sheet reversing mechanism of the present invention is achieved.

The downstream end of the transportation path 30 is connected to the transportation path of the reading device 50.

The device body 10 includes a control unit 100. The control unit 100 includes a CPU and a program that operates on the CPU, a storage, and the like. The hardware of the control unit 100 corresponds to a computer in which a program of the present invention is executed, and the storage storing a program corresponds to a non-transitory recording medium storing a computer-readable program according to the present invention. The control unit 100 corresponds to a controller of the present invention.

The reading device 50 includes a transportation path 70 connected to the upstream transportation path 30, the transportation path 70 is provided with a transfer roller 71, and the downstream end of the transportation path 70 is connected to an output tray 80.

In the reading device 50, a line sensor 60 and a line sensor 61 are disposed in this order on the top surface of the transportation path, along the transportation path 70, and in the sheet transporting direction. The line sensor 60 and the line sensor 61 can perform image reading for the same surface of a sheet, and receive the reflected light of emitted light to acquire image data. The line sensor 60 and the line sensor 61 correspond to the image reader of the present invention.

The line sensor 60 and the line sensor 61 can be composed of CCDs, CMOSs, and the like. The line sensors 60 and 61 have such a width that sheet reading can be performed within at least a sheet width. In addition, although not shown in the drawing, the line sensors 60 and 61 are provided with a member that performs cleaning by removing adhering paper particles. The present invention can employ any method of cleaning, for example, cleaning using a brush or cleaning using gas injection or vibration. Paper particles and the like adhering to the line sensors can be removed by any one of these methods or multiple cleaning functions can be provided.

The reading device 50 includes a reading control unit 500, the operations of the line sensors 60 and 61 can be controlled by the control unit 100 through the reading control unit 500, and the reading results are transmitted to the control unit 100. The reading control unit 500 includes a CPU and a program that operates on the CPU, a storage, and the like.

The reading control unit 500 corresponds to the reading controller of the present invention.

Only one of the line sensors 60 and 61 can be used alone or both can be used by switching, and switching between the line sensors 60 and 61 to be read is controlled by the control unit 100.

Although the image forming device 1 includes two line sensors in this embodiment, the present invention can include any number of but more than one line sensors. In addition, although the reading device 20 includes multiple image readers according to the description in this embodiment, multiple image readers can be provided to different devices. For example, one image reader can be provided to the device body and the other image readers can be provided to the reading device.

In addition, although the image readers for reading the same surface of a sheet are present on the same side of the sheet according to the description in the above-described embodiment, in the case where the sheet is supposed to be flipped over, another image reader can be disposed on the opposite side.

Figure 2:
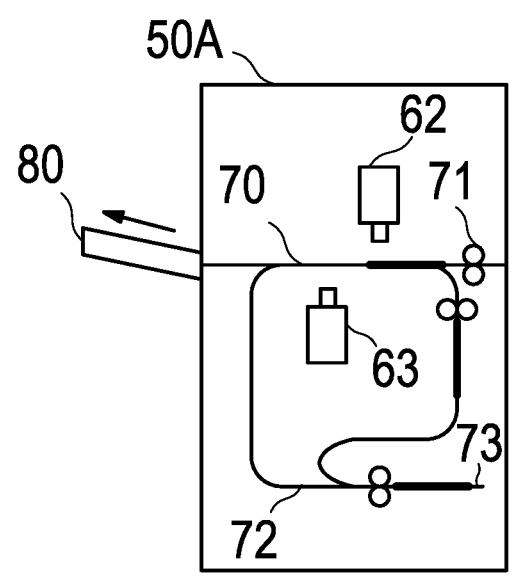
FIG. 2 is a diagram showing a variation of a reading device of one embodiment of the present invention.

FIG. 2 shows a variation of a reading device. It should be noted that the same component as that in the above description can be denoted by the same reference numeral as it, for omission or simplification of description.

A reading device 50A in this variation includes a transportation path 70, and a flipping transportation path 72 branches from the transportation path 70 in the middle and meets the upstream transportation path 70.

In the transportation path 70, in a spot which is an upstream spot in which the flipping transportation path 72 branches and a downstream spot in which the flipping transportation path 72 meets, a line sensor 62 is provided above the transportation path and a line sensor 63 is provided below the transportation path.

The line sensors 62 and 63 can be composed of CCD sensors and the like, and can read an image on a sheet by receiving the reflected light of emitted light. The line sensor 62 reads an image on the top surface of the sheet, and the line sensor 63 reads an image on the rear surface of the sheet. The line sensors 62 and 63 have such a width that sheet reading can be performed within at least a sheet width. The line sensors 62 and 63 correspond to the image reader of the present invention.

It should be noted that the branching flipping transportation path 72 includes, in the middle, a flipping unit 73 into which the entire sheet can be introduced. In the case where the sheet should be flipped over, the sheet is transported to the flipping transportation path 72 and then introduced to the flipping unit 73, and the sheet with its bottom end facing forward is transported downstream of the flipping transportation path 72 to be flipped over and is transported back to the transportation path 70.

In the case where an image on one surface of a sheet is read with two line sensors, the image on the sheet transported along the transportation path 70 is read by one of the line sensors 62 and 63, and the sheet is then transported along the flipping transportation path 72 and is then read by the other line sensor, so that the same surface can be read by multiple line sensors. When reading is performed using a single line sensor, the sheet can be transported straight for image reading.

Figure 3:
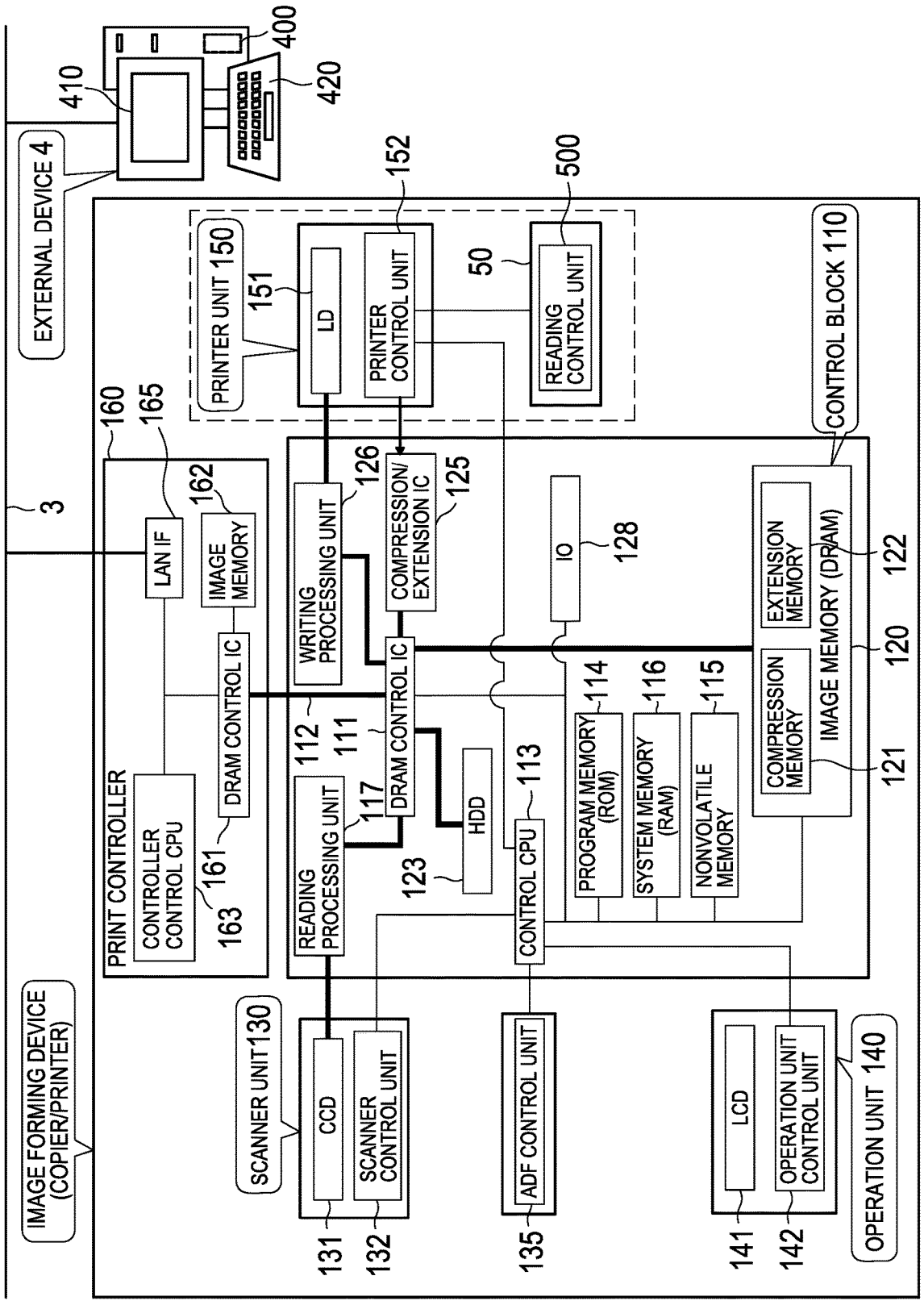
FIG. 3 is a diagram showing a control block according to one embodiment of the present invention.

The functional configuration of the image forming device 1 will now be described with reference to the block diagram of FIG. 3.

The image forming device 1 mainly consists of a control block 110, a scanner unit 130, an operation unit 140, a printer unit 150, and a print controller 160.

The print controller 160 receives and processes image data input from an external device 4 used as a terminal PC via a network 3, or image data obtained through a scanner unit 130 is made transferrable to the external device 4 via the network 3.

The control block 110 includes a PCI bus 112 connected to the print controller 160, and the PCI bus 112 is connected to a DRAM control IC 111. The DRAM control IC 111 is connected to an image memory (DRAM) 120. The image memory (DRAM) 120 includes a compression memory 121 for storing compressed image data, and an extension memory 122 for temporarily storing, before image formation, uncompressed image data to be printed.

Moreover, the DRAM control IC 111 is connected to a hard disc (HDD) unit 123, and the hard disc (HDD) unit 123 stores, for example, image data acquired through the scanner unit 130 and image data acquired through the print controller 160.

Image data acquired through the print controller 160 and image data stored in the hard disc (HDD) unit 123 are transmitted to the DRAM control IC 111 according to the print operation via the PCI bus 112.

The control block 110 includes a control CPU 113. The control CPU 113 is connected to the DRAM control IC 111.

In addition, the control CPU 113 is connected to a program memory (ROM) 114, a system memory (RAM) 116, and a nonvolatile memory 115. The program memory (ROM) 114 is composed of a ROM and stores a program and the like for operating the control CPU 113. The system memory (RAM) 116 is composed of a RAM and is used as a work area. The nonvolatile memory 115 is composed of a flash memory, for example.

The nonvolatile memory 115 stores information about the initial settings of the device body 10, information about machine settings, such as process control parameters, post-processing settings, data of sheet information, information about tray settings, and information about settings related to image failure/no-failure determination according to the results of reading through the line sensors 60 and 61, line sensor abnormality determination, and the like.

The control CPU 113 can read nonvolatile data in the nonvolatile memory 115 and write target data to the nonvolatile memory 115.

The control CPU 113 executes a predetermined operation with the program stored in the program memory (ROM) 114 and controls the operations of the components of the device body 10 and the reading device 20 according to the information about machine settings, information about print settings, output settings, and the like. The program in the control CPU 113 includes a program of the present invention. The program can be stored in a portable storage for use. The storage storing a program corresponds to a non-transitory recording medium storing a computer-readable program according to the present invention.

The control CPU 113 is included in the control unit 100 of the present invention together with the program memory (ROM) 114, the system memory (RAM) 116, the nonvolatile memory 115, and the like, and can control execution of a job, failure/no-failure determination for the output based on the image reading results given by the reading device, failure/no-failure determination for the line sensors, and switching between the line sensors for reading. To be specific, in the control unit 100, image failure/no-failure determination for a transfer medium can be performed according to the reading results, image reading by multiple image readers is switchable between reading by all the image readers and reading by part of the image readers, and, during reading by part of the image readers, at least one of the other image readers can perform a maintenance operation for the at least one of the other image readers. Further, in the control unit 100, image reading is switchable between reading by a first number of image readers and reading by a second number of image readers (the second number is smaller than the first number), and, during reading by the second number of image readers, at least one of the other image readers can perform a maintenance operation for the at least one of the other image readers. The first number and the second number can be any numbers. The number of the other image readers that perform a maintenance operation can be any number, for example, one of the other image readers can perform a maintenance operation, or all of the other image readers can perform a maintenance operation.

Furthermore, in the control unit 100, while image reading is performed by the second number of image readers, if the image readers require correction at a predetermined time as a maintenance operation, or at a predetermined time, at least one of the other image readers not performing image reading can perform image reading and the image readers requiring correction can perform the correction. The number of the other image readers that perform image reading can be any number, for example, one of the other image readers can perform image reading, or all of the other image readers can perform image reading.

The control CPU 113 can control the components in accordance with the output settings, operation specifications, and the like related to a job input through the operation unit 140 or an external operation unit in the external device 4.

The scanner unit 130 includes a CCD 131 that performs optical reading, and a scanner control unit 132 that controls the overall scanner unit 130. The scanner control unit 132 is connected to the control CPU 113 in such a manner that they can serially communicate with each other. In addition, the CCD 131 is connected to a reading processing unit 117, and the reading processing unit 117 is connected to and can be controlled by the DRAM control IC 111.

The reading processing unit 117 performs processing of image data read by the CCD 131. The reading processing unit 117 performs various types of processing such as analog signal processing, analog to digital (A/D) conversion, shading, and other processing on analog image signals input from the CCD 131 to generate digital image data which is then output to a compression/extension IC 125.

In addition, the control CPU 113 is connected to and can be controlled by an ADF control unit 135 in a controllable manner. The ADF control unit 135 controls an inflow-type automatic document feeding device (ADF) which is not shown in the drawing.

The scanner unit 130 reads the images on documents placed on the upper platen glass of the device body 10 and documents automatically transported by an inflow-type automatic document feeding device (ADF) which is not shown in the drawing.

The operation unit 140 includes an LCD 141 including a touch screen and an operation unit control unit 142 that controls the entire operation unit, and serves multiple duty as an operation unit and a display. The operation unit control unit 142 is connected to the control CPU 113 in such a manner that they can serially communicate with each other.

The operation unit 140 enables, through the LCD 141 in accordance with control by the control CPU 113, input of output condition settings, machine settings of operation control conditions, and the like related to the device body 10, input of settings of sheet information (size and sheet type) related to each sheet feeding tray, settings related to (one or all, first number or second number of) line sensors for image reading, and presentation of information about detected waste, and the like.

The DRAM control IC 111 is connected to the compression/extension IC 125 that can compress or extend image data. The DRAM control IC 111 controls, in accordance with a command from the control CPU 113, compression of image data and extension of compressed image data by the compression/extension IC 125 and controls input/output of image data to/from the image memory (DRAM) 120.

Further, the DRAM control IC 111 is connected to a writing processing unit 126. The writing processing unit 126 is connected to the image forming unit 11 including an LD 151 of the printer unit 150 and the like and generates write data used for the operation of the LD 151 in accordance with image data.

The printer unit 150 includes a printer control unit 152. The printer control unit 152 is connected to the control CPU 113 in such a manner that they can serially communicate with each other. The printer control unit 152 operates with control instructions from the control CPU 113, controls the entire printer unit 150 (e.g., sheet feeding, image formation, sheet transportation, switching of the output tray, and post-processing), and performs sheet transportation and image formation. In addition, the printer control unit 152 can instruct the compression/extension IC 125 to extend compressed image data.

Moreover, the printer control unit 152 is connected to the reading control unit 500 in the reading device 50 in a controllable manner. The printer control unit 152 can send a control instruction to the reading control unit 500 in accordance with an instruction from the control CPU 113, and can acquire information about the state of the reading device 50 from the reading control unit 500. The reading control unit 500 can control the entire reading device 50, and performs reading control, transportation control, and the like in the reading device 50. The reading control unit 500 can be composed of a CPU, a program for operating the CPU, and the like.

Further, the PCI bus 112 is connected to a DRAM control IC 161 of the print controller 160. When the device body 10 is used as a network printer or network scanner, the print controller 160 receives, at the device body 10, image data and the like from the external device 4 connected to the network 3, and transmits image data, which is acquired through the scanner unit 130, to the external device 4 connected to the network 3.

In the print controller 160, the DRAM control IC 161 is connected to an image memory 162 composed of a DRAM, for example. Further, in the print controller 160, the common bus is connected to the DRAM control IC 161, a controller control CPU 163 that controls the entire print controller 160, and a LAN interface 165. The LAN interface 165 is connected to the network 3.

In addition, the control CPU 113 is connected to an IO 128. The IO 128 can acquire signals from various sensors in and out of the image forming device 1 and can acquire image reading results from the line sensors 60 and 61, for example.

The external device 4 connected to the image forming device 1 includes an external control unit 40, which controls the entire external device 4, an operation screen 410, and an external operation unit 420. The operation screen 410 and the external operation unit 420 can be formed in such a manner that the operation unit and the display are integrally formed using an LCD with a touch screen or the like.

The external control unit 400 includes a CPU and a program that operates on the CPU. The external device 4 can control the image forming device 1. In this case, the external control unit 400 serves as a processing controller of the present invention, the hardware of the external control unit 400 corresponds to a computer in which a program of the present invention is executed, and the storage storing a program corresponds to a non-transitory recording medium storing a computer-readable program according to the present invention. In this case, the external device 4 can serve as an image processing device in which failure/no-failure determination is performed for the image of a transfer medium on the basis of the results of reading of the image, and image reading by multiple image readers is switchable between reading by all the image readers and reading by part of the image readers, and, during reading by part of the image readers, at least one of the other image readers can perform a maintenance operation for the at least one of the other image readers. Further, in the external device 4, image reading is switchable between reading by a first number of image readers and reading by a second number of image readers (the second number is smaller than the first number), and, during reading by the second number of image readers, at least one of the other image readers can perform a maintenance operation for the at least one of the other image readers. The number of the other image readers that perform a maintenance operation can be any number, for example, one of the other image readers can perform a maintenance operation, or all of the other image readers can perform a maintenance operation. Furthermore, in the external device 4, while image reading is performed by the second number of image readers, if the image readers require correction at a predetermined time as a maintenance operation, or at a predetermined time, at least one of the other image readers not performing image reading can perform image reading and the image readers requiring correction can perform the correction. The number of the other image readers that perform image reading can be any number, for example, one of the other image readers can perform image reading, or all of the other image readers can perform image reading.

The basic operation of the image forming device 1 will now be explained.

First, a process for accumulating image data in the image forming device 1 will be explained.

First, the case where, in the image forming device 1, the scanner unit 130 reads an image and image data is generated will be explained. First, in the scanner unit 130, the CCD 131 optically reads an image from a document. At this time, the control CPU 113 sends an instruction to the scanner control unit 132, and the scanner control unit 132 controls the operation of the CCD 131. The document can be read by the inflow-type automatic document feeding device (ADF), which is not shown in the drawing, while the document is fed or when the document is placed on the platen glass. The control CPU 113 operates with a program and issues a command to the scanner unit 130 on the basis of the operation using the operation unit 140.

An image read by the CCD 131 is subjected to data processing in the reading processing unit 117, image data after data processing is transmitted to the compression/extension IC 125 via the DRAM control IC 111 and then is compressed by a predetermined method. Compressed data is stored in the compression memory 121 via the DRAM control IC 111. To store data in the hard disc (HDD) unit 123, data temporarily stored in the compression memory 121 is transmitted to the hard disc (HDD) unit 123 via the DRAM control IC 111.

In addition, image data can be input to the image forming device 1 via the network 3. Examples of the image data include image data generated by an application program, such as the external device 4, and image data generated by other image forming devices. The data is received at the print controller 160 via the network 3 and the LAN interface 165 and is temporarily stored in the image memory 162 through the DRAM control IC 161. The data stored in the image memory 162 is transmitted to the DRAM control IC 111 via the PCI bus 112 and is temporarily stored in the extension memory 122. Data stored in the extension memory 122 is transmitted to the compression/extension IC 125 via the DRAM control IC 111 to be subjected to compression, and then is stored in the compression memory 121 via the DRAM control IC 111. To store data in the hard disc (HDD) unit 123, data temporarily stored in the compression memory 121 is transmitted to the hard disc (HDD) unit 123 via the DRAM control IC 111.

Next, to output the image through the image forming device 1, the data stored in the compression memory 121 and the hard disc (HDD) unit 123 are used. The image data stored in the hard disc (HDD) unit 123 is temporarily stored in the compression memory 121 via the DRAM control IC 111. The data stored in the compression memory 121 is transmitted to the compression/extension IC 125 via the DRAM control IC 111 to be extended. The extended data is sent to the writing processing unit 126 via the DRAM control IC 111 to generate write data which is then written to a photoreceptor in the LD 151.

In the printer unit 150, the printer control unit 152 receiving an instruction from the control CPU 113 controls the sheet feeding tray 18, the transportation path 30, and other components. In the printer unit 150, image formation, transfer to the sheet, fixation, transportation to the reading device 50 along the transportation path, image reading in the reading device 50, a correction operation, and the like, for example, are performed in sequence for printing output.

Further, the device body 10 can acquire the image reading results, which are read by the line sensor 60 and/or the line sensor 61, at the control CPU 113 through the IO 128, and the control unit 100 can determine, from the image reading results, a failure/no-failure in the image on the transported sheet or a failure/no-failure in the line sensor(s).

Although the image reading results obtained through the reading device 50 or the reading device 50A are acquired through the control unit 100, and the control unit 100 determines a failure/no-failure in the output or a failure/no-failure in the line sensors based on the reading results and performs switching between the line sensors in this embodiment, these operations can be controlled by the reading device. To be specific, in the reading control unit, reading results are obtained, failure/no-failure determination is performed for the image of a transfer medium on the basis of the reading results, and image reading by the multiple image readers is switchable between reading by all the image readers and reading by part of the image readers, and, during reading by part of the image readers, at least one of the other image readers can perform a maintenance operation for the at least one of the other image readers. Further, in the reading control unit, image reading is switchable between reading by a first number of image readers and reading by a second number of image readers (the second number is smaller than the first number), and, during reading by the second number of image readers, at least one of the other image readers can perform a maintenance operation for the at least one of the other image readers. The number of the other image readers that perform a maintenance operation can be any number, for example, one of the other image readers can perform a maintenance operation, or all of the other image readers can perform a maintenance operation. Furthermore, in the reading control unit, while image reading is performed by the second number of image readers, if the image readers require correction at a predetermined time as a maintenance operation, or at a predetermined time, at least one of the other image readers not performing image reading can perform image reading and the image readers requiring correction can perform the correction. The number of the other image readers that perform image reading can be any number, for example, one of the other image readers can perform image reading, or all of the other image readers can perform image reading.

The hardware of the reading control unit at this time corresponds to a computer in which a program of the present invention is executed, and the storage storing a program corresponds to a non-transitory recording medium storing a computer-readable program according to the present invention.

Embodiment 1

An embodiment in which two line sensors concurrently perform image reading will now be described.

In this embodiment, the line sensor that performs reading first is a first line sensor, and the line sensor that performs reading next is a second line sensor.

Figure 4:
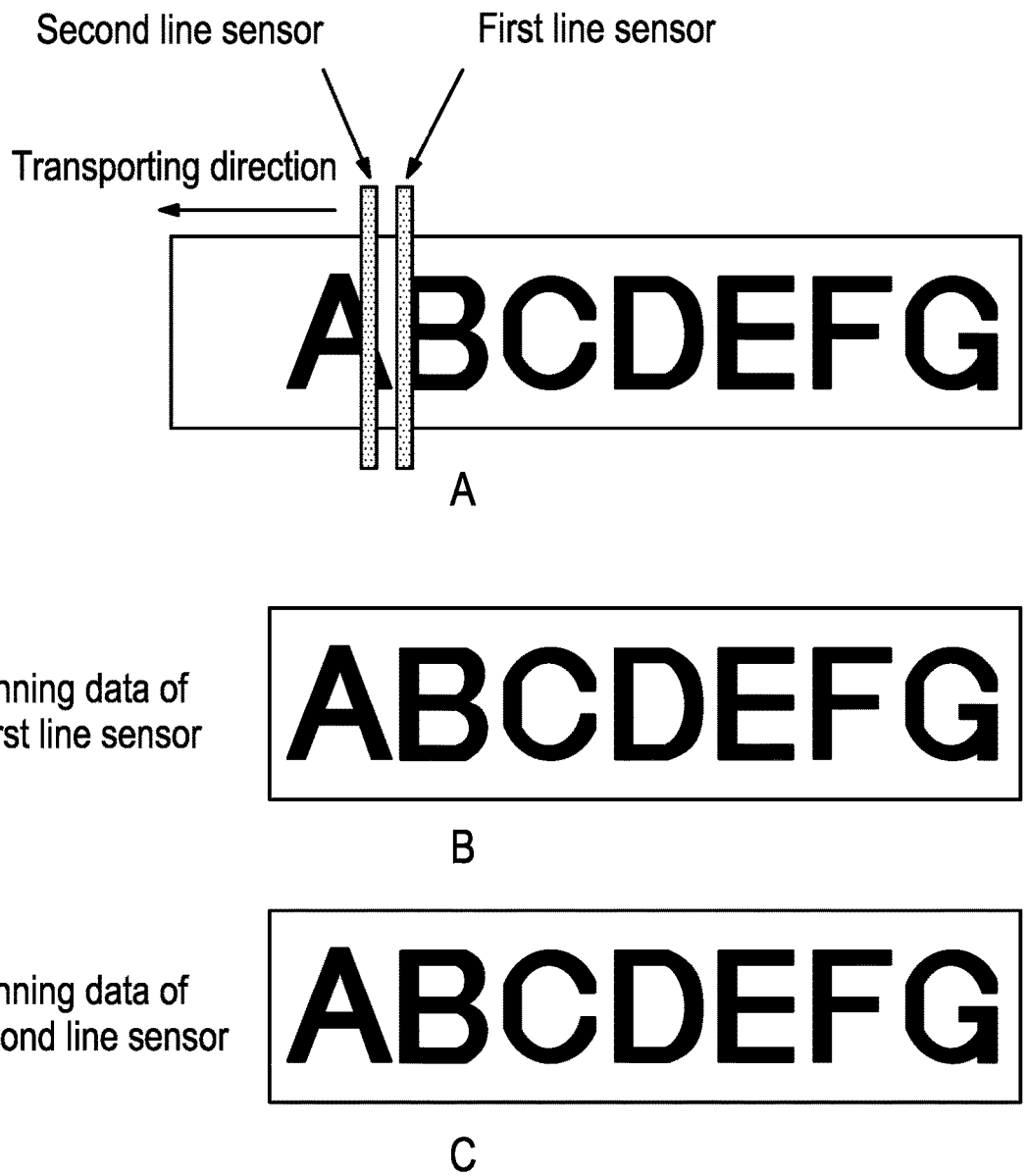
FIG. 4 is a diagram for explaining the state where image reading is performed using two line sensors according to one embodiment of the present invention.

FIG. 4A schematically shows the state where an image printed on a continuous sheet of paper is read by the first line sensor and the second line sensor. The reading results provided by the first line sensor and the second line sensor are shown in FIGS. 4B and 4C. In waste detection, acquired image data is divided per page and compared with the original image data to check whether the output is a correct image based on the original image. In the case of reading with the scanner unit, the original image data can be image data that is subjected to image processing and then stored in the image memory (DRAM) 120, the hard disc (HDD) unit 123, or the like. In the case where image data is acquired through the print controller 160, image data acquired by image processing in the print controller 160 and then stored in the image memory (DRAM) 120, the hard disc (HDD) unit 123, or the like can be used as the original image data.

In this embodiment, the original image data is compared with images according to the reading results acquired by the first line sensor and the second line sensor. If these three images all match, it is determined that there is no waste and reading processing is continued.

If the images acquired through the first line sensor and the second line sensor both differ from the original image data and a waste is found therein, it is determined that the output has a waste, and processing supposed to be performed upon waste detection is carried out. For example, job output is halted, the waste sheet and the sheets remaining in the device are pre-purged and ejected to an output destination different from that for a usual job, and printing is performed again as needed.

Figure 5:
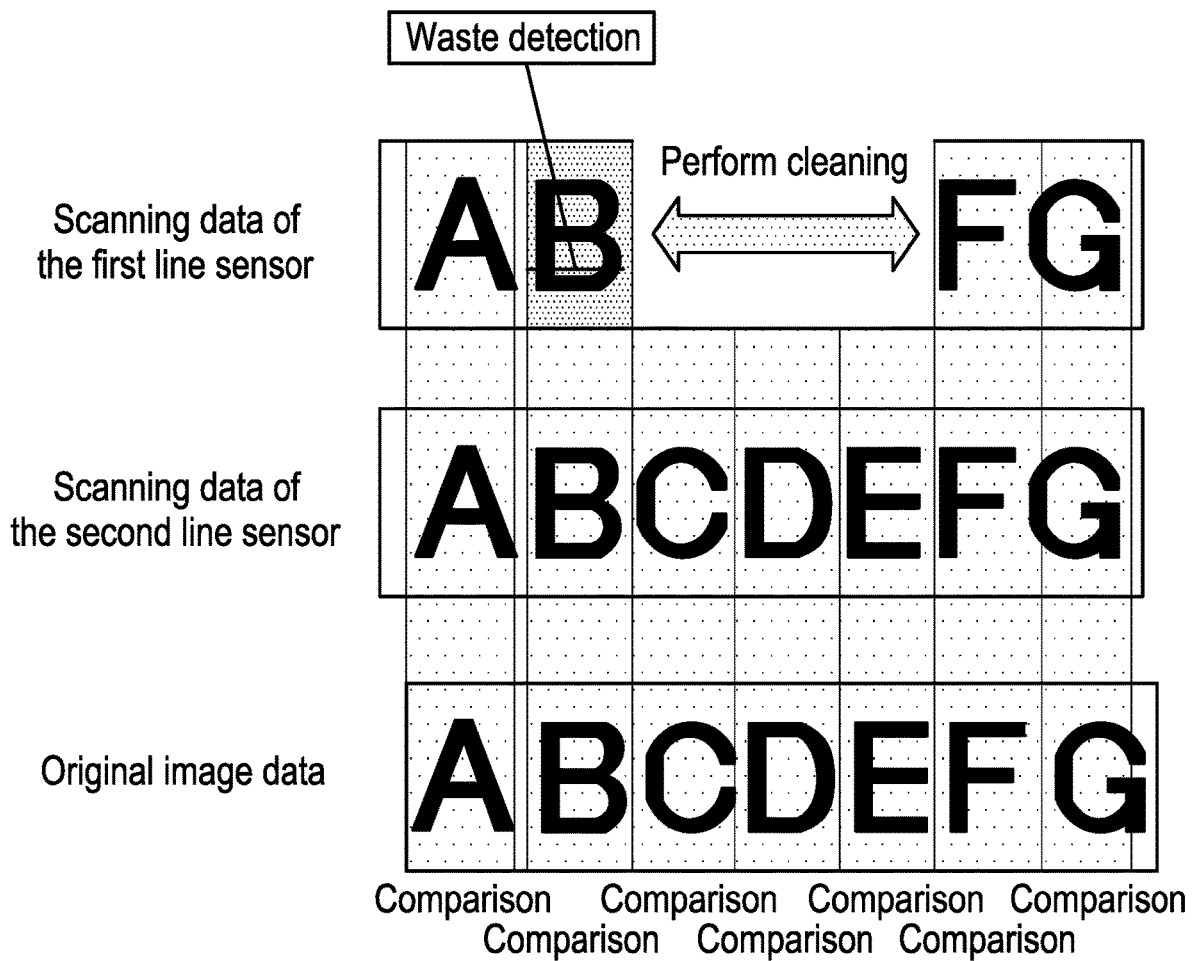
FIG. 5 is a diagram for explaining the state where cleaning is performed when image reading is performed using two line sensors according to one embodiment of the present invention.

When one of the first line sensor and the second line sensor detects a waste, and the other does not detect the waste, it is determined that dust exists on the line sensor that has detected the waste, and, as shown in FIG. 5, the line sensor is cleaned. In this example, it is determined that the first line sensor has dust adhering to it. During cleaning of the line sensor, this line sensor cannot read the image on the output. Therefore, during the cleaning of one line sensor, the image data read by the other line sensor is compared with the original image data to perform waste detection.

Upon completion of cleaning of the line sensor, a comparison between three images: image data acquired by both line sensors and the original image data is performed again, thereby performing waste detection.

Similarly, upon necessity of shading correction by one line sensor, scanning of the output is impossible during correction. Accordingly, even when one line sensor starts shading correction, only image data obtained through image reading by the other line sensor is compared with the original image data, thereby performing waste detection. At this time, a control operation is performed in such a manner that the first line sensor and the second line sensor do not perform shading correction at the same time.

Although, conventionally, reading with a reading device stops due to cleaning of a line sensor or shading correction and down-time occurs, if two line sensors are provided to perform the above-described control operation, continuous image reading can be performed in a reading device without causing down-time. In addition, in the case of a continuous sheet of paper such as roll paper, waste detection for the entire surface, which has been impossible with a single line sensor, is achieved. It should be noted that cleaning and shading correction correspond to a maintenance operation for line sensors.

Figure 6:
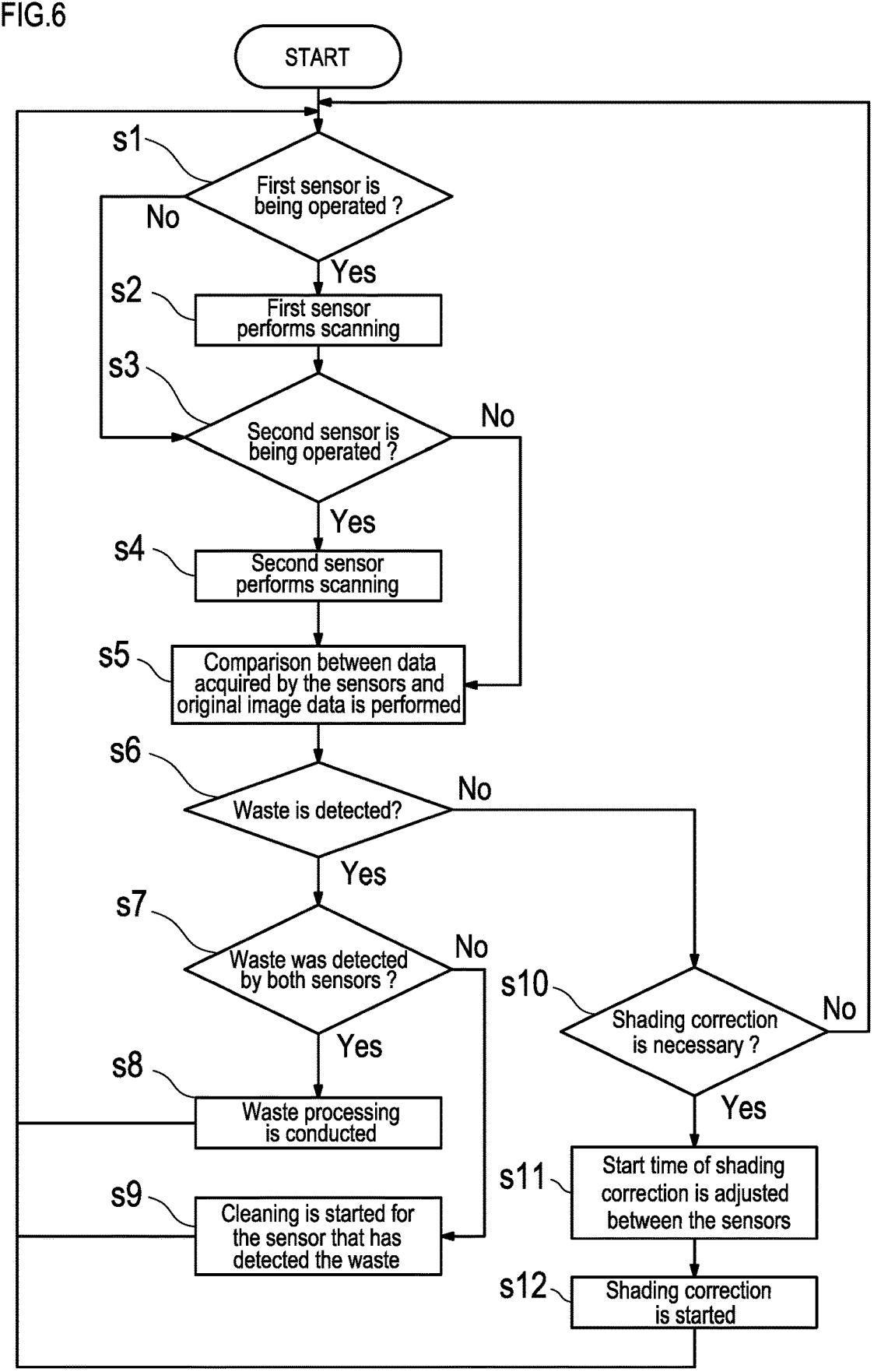
FIG. 6 is a diagram for explaining a procedure for image reading using two line sensors according to one embodiment of the present invention.

The procedure of the above-described operation will be described with reference to the flow chart of FIG. 6. It should be noted that the following procedure is executed under control by the control unit and the like. In addition, in the flow chart, the first line sensor is denoted by a first sensor, and the second line sensor is denoted by a second sensor, and description will be made according to this (the same applies to the following flow charts).

Upon initiation of the procedure, whether the first sensor is being operated is determined (Step s1). If the first sensor is being operated (Step s1, Yes), the first sensor performs scanning (image reading) (Step s2). Next, whether the second sensor is being operated is determined (Step s3). If the first sensor is not being operated in Step s1 (Step s1, No), the process proceeds to Step s3 in which whether the second sensor is being operated is determined.

If the second sensor is being operated (Step s3, Yes), the second sensor performs scanning (Step s4), and a comparison between data acquired by the sensors and original image data is performed (Step s5). Meanwhile, in Step s3, if the second sensor is not being operated (Step s3, No), the process proceeds to Step s5 in which the above-described comparison is performed.

After Step s5, waste detection is performed (Step s6).

If a waste is found (Step s6, Yes), whether the waste was detected by both sensors is determined (Step s7).

If the waste was detected by both sensors (Step s7, Yes), the output is determined to be failed and waste processing is conducted (Step s8). The process then returns to Step s1 in which the same process is performed for the next page. If the next page does not exist, the process ends. In waste processing, for example, the output of the job is stopped, and the sheets remaining in the device are pre-purged. At this time, the pre-purged sheets can be ejected to an output destination different from that for a usual job. Note that, waste processing in the present invention can be performed in any manner, and appropriate processing can be performed. The same applies the following embodiments.

If it is determined that one sensor finds a waste during waste detection (Step s7, No), it is determined that the sensor that is abnormal has dust adhering to it, and cleaning of the sensor that has detected the waste is started (Step s9). After cleaning, the process returns to Step s1 and the same process is performed for the next page. If the next page does not exist, the process ends.

If no waste is detected in Step s6 (Step s6, No), whether shading correction is necessary is determined (Step s10). If shading correction is not necessary (Step s10, No), the process returns to Step s1 and the same process is performed for the next page. If the next page does not exist, the process ends.

If shading correction is necessary (Step s10, Yes), the start time of shading correction is adjusted between the sensors (Step s11) and one sensor performs shading correction (Step s12). After correction, the process returns to Step s1 and the same process is performed for the next page. If the next page does not exist, the process ends.

In this embodiment, two line sensors are provided, and scanning for waste detection is normally performed using the two sensors. When either one of the sensors detects a waste or needs shading correction, only the other sensor performs scanning for waste detection. In this manner, either one of the sensors always performs scanning; thus, even if printing is continuously performed for a long time, prevention of a reduction in productivity, and waste detection for the entire surface of a continuous sheet of paper, such as roll paper, can be achieved during the halt of the sensor.

Embodiment 2

In Embodiment 1, since image data obtained by scanning by two sensors are concurrently processed, productivity can be affected if the processing performance of the CPU is not adequately high. In addition, since image data acquired by two sensors needs to be concurrently expanded, memory is consumed for that.

To provide the same effects as in Embodiment 1, even for a low-end machine that does not have adequate processing performance or memory, Embodiment 2 alternately uses two sensors to prevent two pieces of image data from being treated concurrently.

Figure 7:
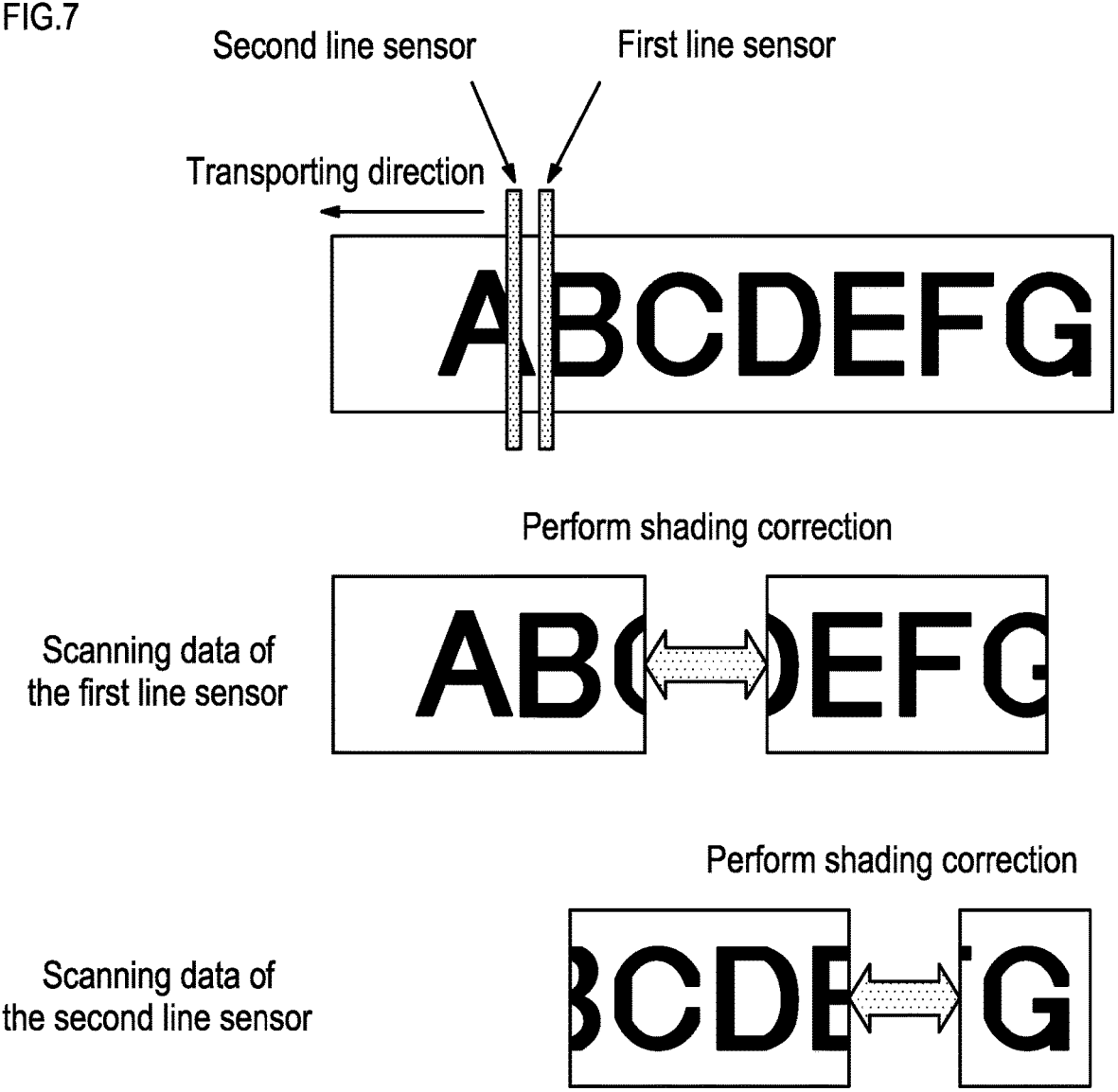
FIG. 7 is a diagram for explaining the state where shading correction is performed when image reading is performed using a single line sensor in another embodiment.

In the example shown in FIG. 7, a reading device is provided with two line sensors, the first line sensor starts scanning from an appropriate position and performs scanning for a predetermined interval. After scanning is continuously performed for a predetermined time, the second line sensor is notified of the fact that shading correction is started. The predetermined interval after which shading correction is started is preset, and an operation is performed according to this setting. The predetermined interval can be set or changed through the operation unit 140.

After receiving the notification that the first line sensor starts shading correction, the second line sensor starts scanning before the first line sensor starts shading correction. The areas on which the first line sensor and the second line sensor perform scanning partly overlap; therefore, even if the area on which the first line sensor performs scanning ends in the middle of a page, the second line sensor can cover it. It should be noted that a reading operation between the line sensors is executed under control by the control unit. When shading correction for the second line sensor is needed at predetermined intervals, on the contrary to the above description, the notification can be sent to the first line sensor and reading can be started, and after that, the second line sensor can perform shading correction.

Accordingly, although the sensors each have an unscannable area during shading correction, combining scanning data of the line sensor and the line sensor allows the entire area to be covered. Further, when waste detection should be conducted page by page, since either of the sensors has a page-by-page scanning area without fail, waste detection can be performed for the entire surface of roll paper. Line sensors are supposed to be alternately used in this example. Alternatively, the operation of Embodiment 1 can be normally performed and, when the load is heavy, the transportation speed is high, or the gap between sheets is small, Embodiment 2 can be implemented.

Figure 8:
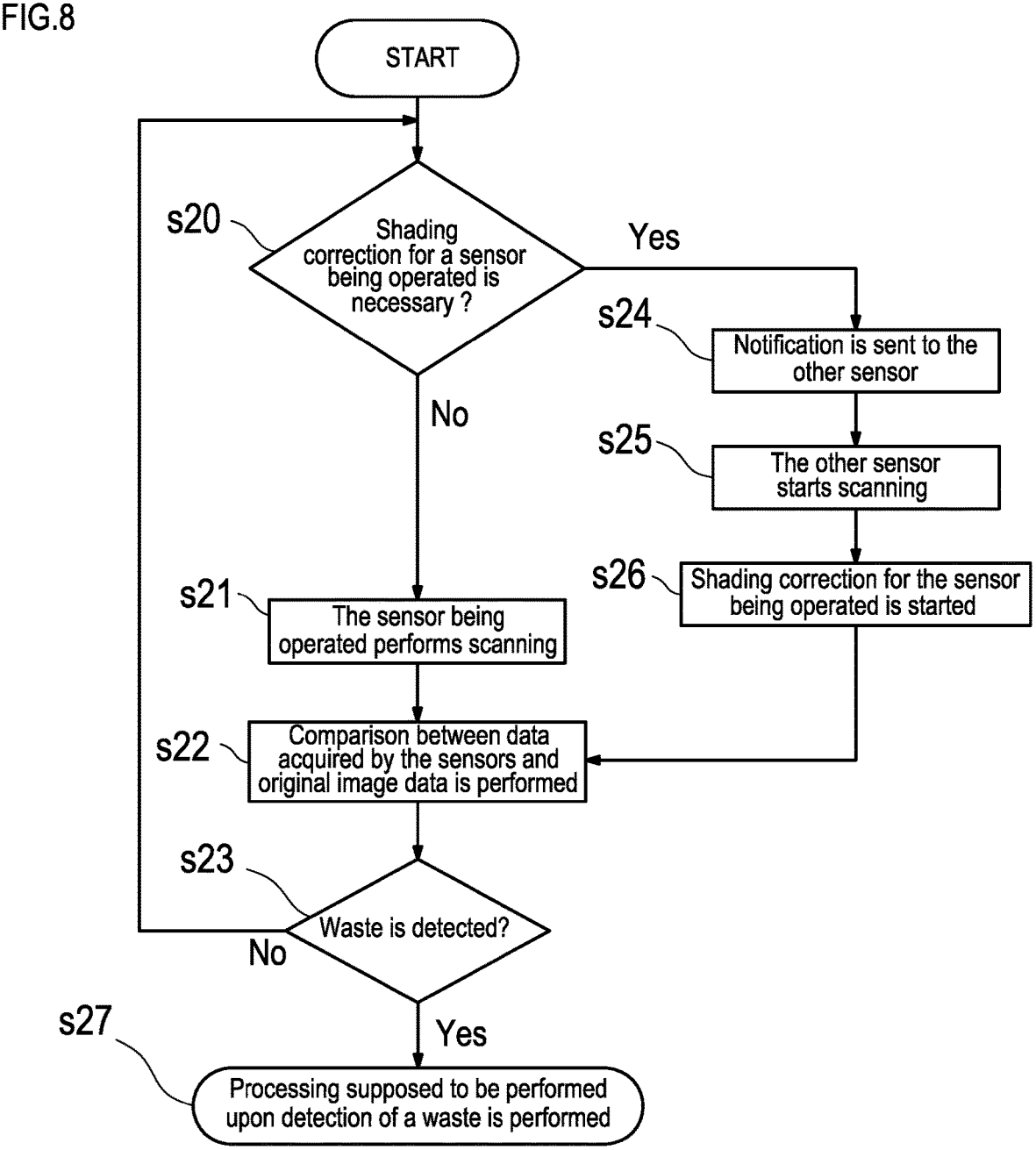
FIG. 8 is a diagram for explaining a procedure for image reading using a single line sensor in another embodiment.

The procedure of the above-described operation will be described with reference to the flow chart of FIG. 8. It should be noted that the following procedure is executed under control by the control unit.

Upon initiation of the procedure, whether shading correction for the sensor being operated is necessary is determined (Step s20). At this time, a single sensor operates.

If shading correction is unnecessary (Step s20, No), the sensor being operated performs scanning (Step s21), and a comparison between data acquired by the sensors and original image data is performed (Step s22). Afterwards, waste detection is performed based on the comparison results (Step s23). If a waste is found (Step s23, Yes), processing supposed to be performed upon detection of a waste is performed (Step s27). If no waste is found (Step s23, No), the process returns to Step s20 and the same process is performed for the next page. If the next page does not exist, the process ends.

In Step s20, if shading correction for the sensor being operated is necessary (Step s20, Yes), a notification is sent to the other sensor which is not subjected to shading correction (Step s24), and the other sensor starts scanning (Step s25). After a predetermined time, the sensor being operated, which needed shading correction, starts shading correction (Step s26). The predetermined time before the start of shading correction is preset, and correction is started according to this setting. The predetermined time is set to the time that the other sensor can cover even when the scanning area of the sensor subjected to shading correction ends in the middle of a page. The predetermined time can be set or changed by the user through the operation unit 140.

After the start of shading correction in Step s26, sensor acquisition data of the sensor performing shading correction and the other sensor are compared with original image data (Step s22), and waste detection is performed in the above-described manner (Step s23).

Embodiment 3

In addition to Embodiment 2, an explanation will be given of a control operation performed when dust is detected by one sensor in the case where the sensors are alternately used.

In this embodiment, normally, the first line sensor reads images.

Figure 9:
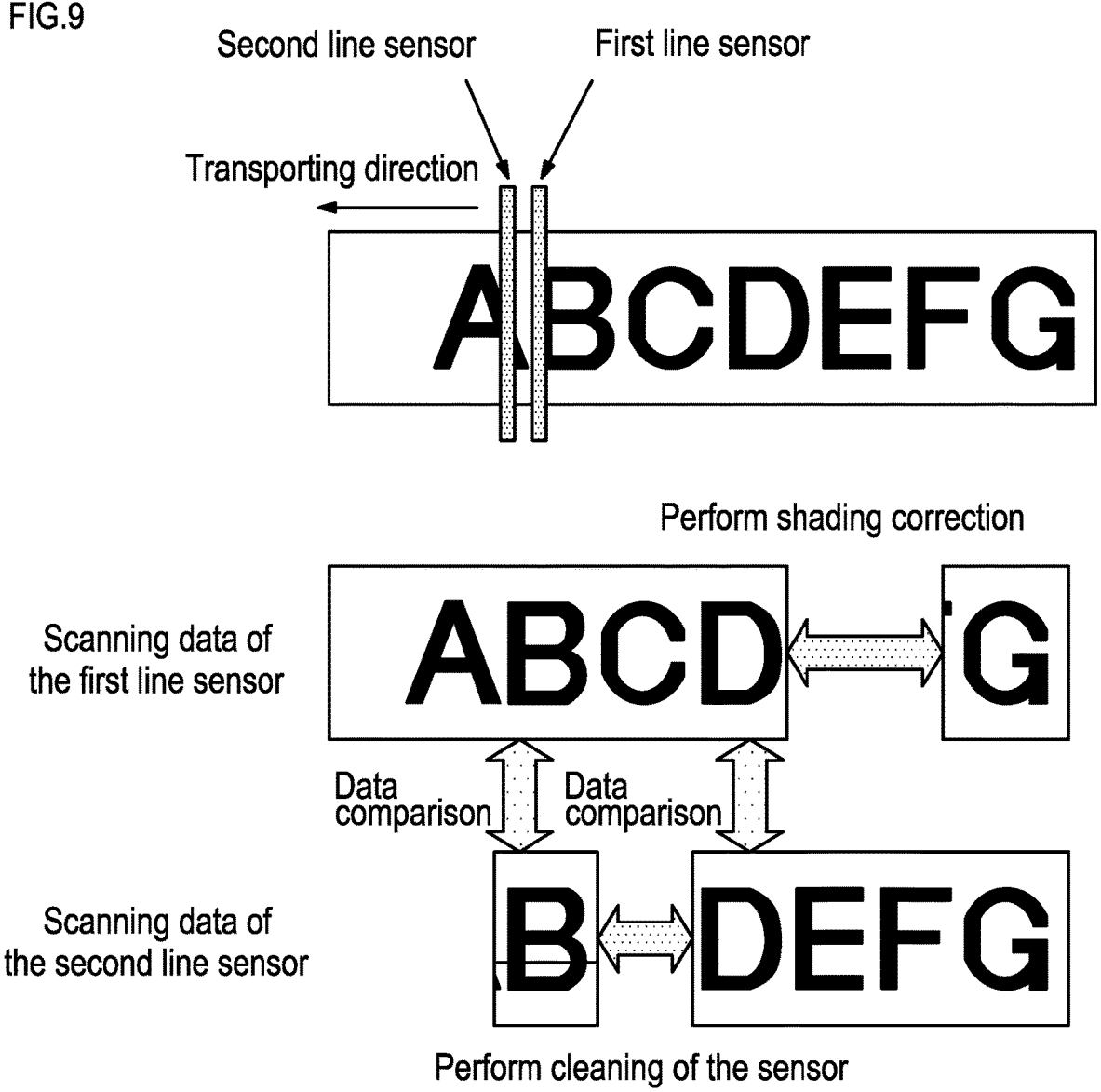
FIG. 9 is a diagram for explaining the state where a maintenance operation is performed when image reading is performed using a single line sensor in the other embodiment.

As shown in FIG. 9, the line sensor (the second line sensor) standing by starts scanning for one page after the other line sensor operated for a predetermined time, and performs a comparison between the resulting scanning data, the data obtained by scanning by the line sensor being operated, and correct data, i.e., RIP data. The predetermined time is preset and the operation is performed according to this setting data. In addition, the predetermined time can be set to a fixed time or can be set shorter as the operation time gets longer. If the operation time gets longer, a sensor is susceptible to more contamination, a correct timing of cleaning can be determined.

Here, if the data temporarily obtained by the line sensor standing by is determined to be a waste, the timing of change to the line sensor being operated is changed and the line sensor being operated continues scanning. During this time, the line sensor standing by performs cleaning for removing dust on the line sensor. Upon completion of cleaning, a comparison between data is performed again, and if the line sensor standing by does not have a problem anymore, the line sensor being operated enters shading correction, and the line sensor standing by is actuated to start scanning. If even the second comparison cannot remove contamination, a warning is displayed and transportation is stopped to promote the user to perform sensor cleaning or change the sensor in which a waste is determined.

Thus, even in the case where the line sensors are alternately used, scanning can be performed without stopping due to dust detection.

Figure 10:
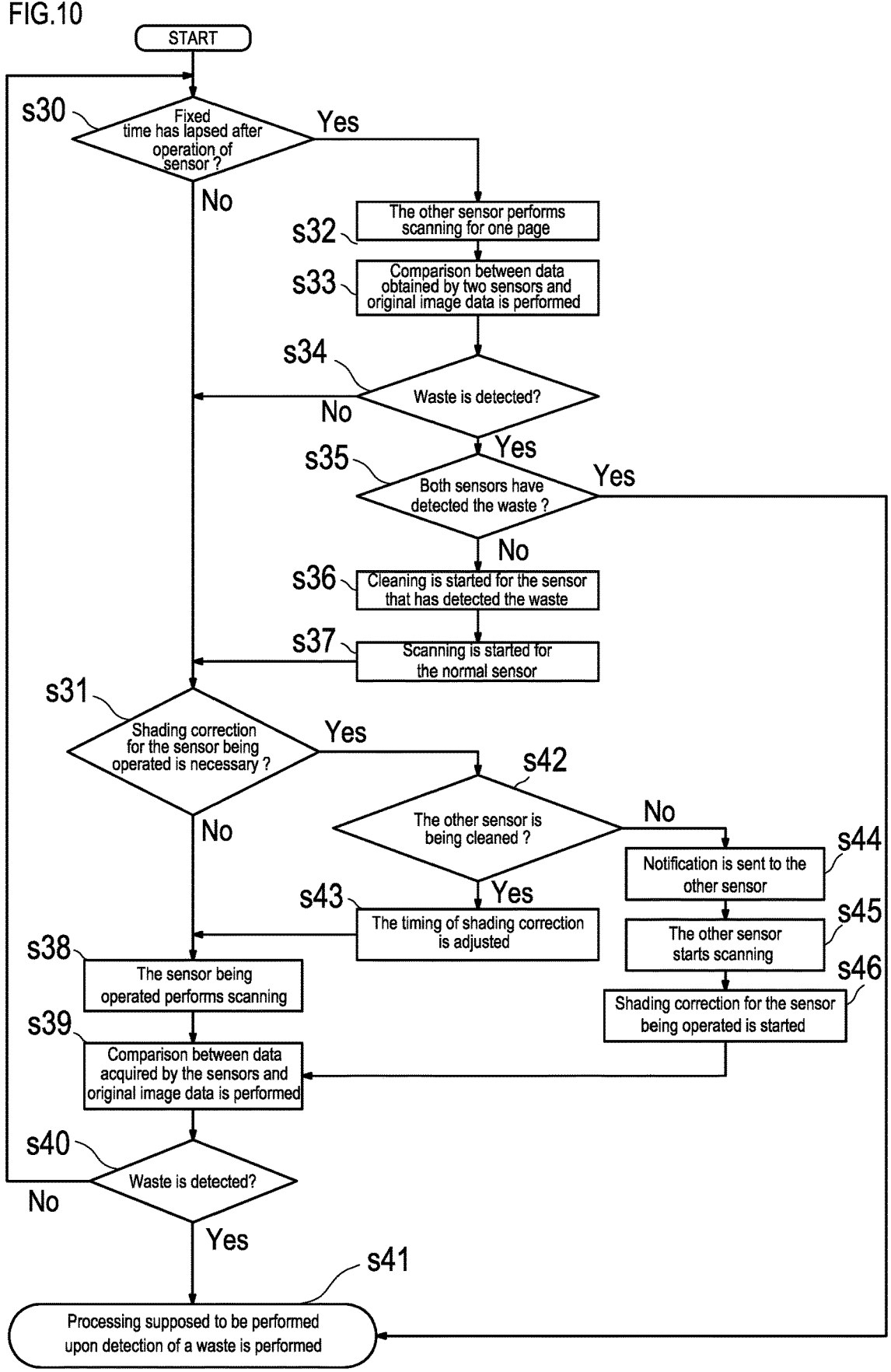
FIG. 10 is a flow chart for explaining a procedure for a maintenance operation when image reading is performed using a single line sensor in the other embodiment.

The procedure of the above-described embodiment will now be explained with reference to the flow chart of FIG. 10. The following procedure is executed under control by the control unit. At the start of the processing, a single line sensor operates. In the procedure, the predetermined time in which reading with the sensor other than the sensor being operated is performed is set to a fixed time.

Upon initiation of the procedure, whether the fixed time has lapsed after the operation of the sensor is determined (Step s30). If the fixed time has not lapsed after the operation of the sensor (Step s30, No), whether shading correction for the sensor being operated is necessary is determined (Step s31).

On the contrary, in Step s30, if the fixed time has lapsed after the operation of the sensor (Step s30, Yes), the other sensor that was not being operated performs scanning for one page (Step s32). Next, a comparison between data obtained by two sensors and original image data is performed (Step s33) to determine whether there is a waste (Step s34). If there is no waste (Step s34, No), the process proceeds to Step s31 in which whether shading correction for the sensor being operated is necessary is determined.

If a waste is detected (Step s34, Yes), whether both sensors have detected the waste is determined (Step s35). If the waste was detected by both sensors (Step s35, Yes), processing supposed to be performed upon detection of a waste is performed (Step s41).

If the waste was not detected by both sensors (Step s35, No), cleaning is started for the sensor that has detected the waste (Step s36), scanning is started for the normal sensor (Step s37), and the process proceeds to Step s31 in which whether shading correction for the sensor being operated is necessary is determined.

If shading correction for the sensor being operated is unnecessary in Step s31 (Step s31, No), the sensor being operated performs scanning (Step s38), and a comparison between data acquired by the sensors and original image data is performed (Step s39). Next, whether a waste has been detected is determined in Step s40.

In Step s31, if shading correction for the sensor being operated is necessary (Step s31, Yes), whether the sensor other than that sensor is being cleaned is determined (Step s42). If the other sensor is being cleaned (Step s42, Yes), the timing of shading correction is adjusted without correction (Step s43). Next, the process proceeds to Step s38 and the sensor being operated performs scanning.

If the other sensor is not being cleaned in Step s42 (Step s42, No), a notification is sent to the other sensor (Step s44), and the other sensor starts scanning (Step s45). Next, shading correction for the sensor being operated is started (Step s46), and the process proceeds to Step s39 in which a comparison between data obtained by the sensors and original image data is performed.

In this embodiment, switching between multiple image readers for use is enabled, so that a maintenance operation for the image readers is executable during image reading, thereby providing the effect of avoiding a reduction in productivity and occurrence of an unreadable range as much as possible.

Although the present invention has been described based on the above-described embodiments, the present invention is not limited to the above-described embodiments and appropriate modifications of the embodiments can be made without departing from the scope of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:
    an image forming unit for forming one or more images on a surface of a sheet which is transported in a transporting direction on a transportation path of the image forming apparatus;
    a first image reader for reading a surface of a sheet on the transportation path;
    a second image reader disposed downstream of the first image reader in the transporting direction for reading a surface of a sheet on the transportation path;
    wherein the image forming apparatus has at least three reading modes including a first reading mode, a second reading mode and a third reading mode,
    wherein the first reading mode is the mode using data obtained from the readings by both the first image reader and the second image reader, the second reading mode is the mode using data obtained from the reading by the first image reader, and the third reading mode is the mode using data obtained from the reading by the second image reader, and
    wherein the image forming unit is controlled in accordance with a result of a reading operation of each of the first reading mode, the second reading mode and the third reading mode.

2. The image forming apparatus according to claim 1, wherein the first image reader and the second image reader both comprise line sensors.

3. The image forming apparatus according to claim 1, wherein the first image reader and the second image reader both comprise CCD or CMOS.

4. The image forming apparatus according to claim 1, wherein the first image reader and the second image reader are disposed above the transportation path.

5. The image forming apparatus according to claim 1, wherein the first image reader and the second image reader are disposed on opposite sides of each other to the transportation path.

6. The image forming apparatus according to claim 1, wherein image failure/no-failure determination is performed based on the data obtained by at least one of the first image reader and the second image reader.

7. The image forming apparatus according to claim 1, wherein the first image reader and the second image reader read a same image of the same single sheet in the first reading mode.

8. The image forming apparatus according to claim 1, wherein a first image read by the first image reader in the second reading mode and a second image read by the second image reader in the third reading mode include a different image.

9. The image forming apparatus according to claim 1, further comprising a third image reader different from the first image reader and the second image reader.

10. The image forming apparatus according to claim 1, further comprising a device body equipped with the image forming unit and a reading device equipped with at least one of the first image reader and the second image reader.

11. The image forming apparatus according to claim 1, wherein the first image reader reads the image formed on the surface.

12. The image forming apparatus according to claim 1, wherein the second image reader reads the image formed on the surface.

13. The image forming apparatus according to claim 1, wherein in the first reading mode, the first image reader and the second image reader read images of different areas in the same single sheet.

* * * * *